United States Patent [19]

Killmer

[11] 3,773,602
[45] Nov. 20, 1973

[54] SIMULATIVE KEYSTONE

[75] Inventor: Roberta Killmer, Cocoa Beach, Fla.

[73] Assignee: Meridian Decorator Accessories and Imports, Inc., Merritt Island, Fla.

[22] Filed: Feb. 8, 1971

[21] Appl. No.: 113,734

[52] U.S. Cl.................. 161/19, 161/231, 161/233, 264/219, 264/220, 264/225, 160/29.2 E
[51] Int. Cl............................ B32b 27/36, B44f 7/00
[58] Field of Search...................... 161/19, 231, 233; 264/219, 220, 225; 260/29.2 E

[56] References Cited
UNITED STATES PATENTS

| | | | |
|---|---|---|---|
| 3,546,052 | 12/1970 | McNamara | 161/19 |
| 3,312,761 | 4/1967 | Vida | 264/77 |

OTHER PUBLICATIONS

Leitheiser, "Polyesters," Modern Plastics Encyclopedia (1969–1970), Vol. 46: No. 10A (October, 1969). pp. 172, 176.

Primary Examiner—Alfred L. Leavitt
Assistant Examiner—Robert A. Dawson
Attorney—Oblon, Fisher & Spivak

[57] ABSTRACT

A composition and process for producing objects of simulative keystone, a naturally occurring fossiliforous coral formation which is indigenous to the Florida Keys. A water-extended polyester resin is mixed with a cobalt salt and a tertiary aromatic amine, followed by the addition of a ketone peroxide, and cast into a keystone mold. Curing takes place rapidly at room temperatures, yeilding a molded object closely resembling natural keystone in color, texture, appearance, and other superficial characteristics.

1 Claim, No Drawings

SIMULATIVE KEYSTONE

BACKGROUND OF THE INVENTION

1. Field of the Invention

This invention relates to a composition and process for producing molded objects of simulative keystone. More particularly, this invention relates to a composition and process for producing molded objects of simulative keystone by casting a water-extended polyester resin mixture in keystone molds to produce objects having the appearance of natural keystone.

2. Description of the Prior Art

Keystone is a naturally occurring fossiliforous material found primarily in the Florida Keys, and is much like a coral formation in appearance. It usually has an off-white color and a fine surface texture resembling that of an egg shell. Because of its pleasing appearance, shapes, texture, and color, keystone has found a wide variety of uses for decorative objects such as lamp bases, figurines, urns, fireplace fronts, and stepping stones. In the area of the Florida Keys, keystone is also often used in structural applications such as columns and building sidings.

While the demand for keystone has been great and continues to increase, both in the area of its chief natural location near the Florida Keys and increasingly elsewhere, keystone has heretofore been available only in the natural state. Not only has the large demand for keystone been difficult to meet due to specimen collection and shipment difficulties, but equally important is the fact that these growth forms contain fossils and accordingly are reformed naturally only over long periods of time. The commercial demand for keystone depletes existing natural formations in readily accessible areas which will not reform for many years. Since the most highly prized features of keystone are found in its shape, texture, color, and other superficial characteristics, it would be highly desirble to be able to synthetically produce objects which simulate these features, thereby greatly decreasing the harvesting of natural keystone formations in the limited geographical areas in which they occur. Furthermore, such a process could enable wider use of such objects, since naturally occurring keystone has some disadvantageous properties such as being subject to breakage in handling. Additionally, a process for producing such objects without the necessity of large capital investments in molding equipment would further extend the availability thereof. The present invention fills such needs.

Many naturally occurring minerals and stones of various types have been made synthetically, and many materials approximating the characteristics of a corresponding naturally occurring material, such as synthetic marble, have been produced from specialized compositions. The present inventor is unaware of any methods in the prior art for producing simulative keystone.

SUMMARY OF THE INVENTION

Accordingly, it is a primary object of the present invention to provide a molded material having the superficial characteristics of naturally occurring keystone.

A principal object of the present invention is to provide a composition and process for producing molded objects of simulative keystone.

Another object of the present invention is to provide a composition and process for producing molded objects of simulative keystone using readily available materials and techniques.

A further object of the present invention is to provide a means for increasing the availability of decorative objects closely resembling natural keystone while reducing the need to harvest naturally occurring keystone formations from the sea floor.

Briefly, these and other objects are attained in one aspect of the present inventon which provides a composition and process for producing objects of simulative keystone by molding a water-extended polyester resin mixed with a cobalt salt, a tertiary aromatic amine, and a ketone peroxide, in a mold which is taken from natural keystone. Curing takes place rapidly at room temperatures, yielding a molded object closely resembling natural keystone in color, texture, appearance, and other superficial characteristics.

The above and other objects, features, and advantages of the invention will become more fully apparent to those skiled in the art from the following description of illustrative embodiments of the invention, which are presented by way of example and not by way of limitation.

DESCRIPTION OF PREFERRED EMBODIMENTS

Water-extendable polyester resins may be any of the known linear unsaturated polyester resins known in the art to which additives such as those taught, inter alia, by Will in U.S. Pat. No. 3,256,219, incorporated herein by reference, have been added to prevent "pimpling" on water extension. In general, such resins have molecular weights of 1,000 – 3,000, preferably from 1,500 – 2,000, and are obtained in a syrup-like solution of the linear unsaturated polyester and a normally liquid vinyl monomer such as styrene, $\alpha$-methyl styrene, vinyltoluene, or the like. A inhibitor may also be included in the solution to prevent premature polymerization. Addition of an active catalyst overcomes the inhibitor, resulting in a three-dimensional cross-linked polymer as the vinyl monomer reacts with the unsaturation in the linear polyester chain.

While suitable water-extendable polyester resins include polyesters prepared from phthalic anhydride, maleic anhydride, and propylene glycol to which the aforementioned additives have been added to make them water-extendable, particularly preferred resins are those mixtures of about 40 percent polyesters prepared from isophthalic acid, maleic anhydride, diethylene-glycol, and propylene glycol, and correspondingly about 60 percent styrene. The amount of styrene used for cross-linking is not critical within a wide range, and thus will normally be determined by the viscosity requirements for a given application. The aforementioned preferred water-extendable polyester resins have an emulsion viscosity at 77° F. (Brookfield LTV using a No. 3 spindle at 30 RPM) of 800 cps. when extended with 50 percent water and 1,800 cps. when extended with 60 percent water.

While a wide variety of water-extended polyester resins, monomers, and catalyst systems are suitable for the purposes of the present invention, preferred materials such as Ashland AIRPOL WEP 660 (Trademark) when used in combination with a ketone peroxide such as methyl ethyl ketone peroxide and a synergistic promoter combination of a cobalt salt such as cobalt naphthenate and a tertiary aromatic amine such as dimethyl aniline, are greatly preferred because they allow curing of the polyester resin at room temperature, thereby greatly simplifying the choice of mold materials and eliminating requirements for any expensive apparatus. Furthermore, use of the above combination of ingredients as described herein results in a final product virtually indistinguishable from natural keystone in superficial properties. While cobalt salts alone promote the breakdown of ketone peroxides at room temperature, the tertiary aromatic amines are ineffective when used alone for this purpose. Tertiary aromatic amines such as dialkyl anilines, particularly dimethylaniline, diethylaniline, and the like, do, however, promote the breakdown of diacyl peroxides such as benzoyl peroxide at room temperature, while the cobalt salts are ineffective for this purpose. As is known in the art, dimethylaniline is synergistic when used with cobalt salts for promoting resins catalyzed with methyl ethyl ketone peroxide, and this combinaton is greatly preferred because of the rapid room temperature gelling characteristics of polyester resins cured with this combination. Other dialkyl anilines, such as diethylaniline, may also be used with comparable results. Since the methyl ethyl ketone peroxide initiates curing rather rapidly in such a system, it is preferably the last ingredient to be added to the composition.

If desired, dry earth powders may be added to obtain various colorations in the final product. While other types of dyes may also be used, the dry earth powders are preferred because they yield a final product which retains the dry look characteristic of natural keystone. The preferred dry earth powders are yellow ochre, yellow oxide, raw umber, raw sienna, brick red, green oxide, red oxide, Venetian red, blue cobalt, burnt umber, lampblack, or black oxide.

Particularly suitable water-extendable polyester resins include the WEP (Trademark) resins produced by Ashland Chemical Company, the POLYLITE (Trademark) water-extendable polyester resins produced by Reichhold Chemical Company, and other similar materials. It is important to dilute the water-extendable polyester syrup with water in a ratio of at least about 1 part polyester syrup to 2 parts of water, and it has been found that the syrup may be diluted with 4 parts of water per part of syrup to yield a molded product which superficially resembles naturally occurring keystone. This is surprising in view of the fact that water-extendable polyester resins are seldom suitable for use in dilutions above approximately 60 percent water to 40 percent resin syrup. Water extension is important not only in obtaining the right consistency in the final molded product, but also in achieving an accurate reproduction from the mold by reducing the viscosity of the composition.

While the proportions of the other added materials are not critical with any wide range, satisfactory results have been attained by the use of 15 to 30 milliliters per gallon of a 12 percent cobalt solution, 15 to 45 milliliters per gallon of methyl ethyl ketone peroxide as a 60 percent solution in dimethyl phthalate, and 20 to 30 milliliters per gallon of dimethylaniline.

The following Examples are presented to illustrate preferred embodiments of the present invention. For each Example, a rubber mold was made of a naturally occurring keystone sample. As previously mentioned, the order of addition of the various components may be varied, except that due to the high reactivity of methyl ethyl ketone peroxide, it is generally advantageous to add it as the last ingredient. All percentages are by volume, unless otherwise indicated. The water-extended polyester resin used in the following examples was AIRPOL (Trademark) WEP (Trademark) 660, obtained from Ashland Chemical Company. The cobalt was added as a 12 percent solution, available from Resin Coatings Company, Miami, Florida, as "Cobalt - 12%". Methyl ethyl ketone peroxide was added as a 60 percent ethyl ketone peroxide in dimethyl phthalate solution, available from Reichhold Chemicals, Inc. as Methyl Ethyl Ketone Peroxide "60." The dimethylaniline was added in undiluted form.

EXAMPLE 1

To 4 gallons of water-extended polyester resin was added 16 gallons of water, 300 cc. of cobalt solution, 90 cc. of dimethylaniline, and 300 cc. of methyl ethyl ketone peroxide solution. The methyl ethyl ketone peroxide was added just prior to pouring the material into the molds. The entire mixture was then cast into molds taken from natural keystone, and allowed to remain at ambient room temperature for 15 to 60 minutes. The curing reaction is exothermic, and upon removing the cured product from the molds, a product was obtained which closely resembled natural keystone in superficial appearances.

EXAMPLE 2

To 2 gallons of water-extended polyester resin was added 8 gallons of water, 45 cc. of dimethylaniline, and 150 cc. of cobalt solution. Just prior to pouring into the molds, 150 cc. of methyl ethyl ketone peroxide was added and mixed thoroughly with the other ingredients. The material was allowed to remain at ambient temperature for approximately 15 minutes until the cured product was too hard to take a fingernail imprint. The only critical feature with respect to curing time is that the material must be left in the mold until it becomes sufficiently hard so that there will not be any breakage when it is removed. Upon removal of the cured product from the molds, a molded object was obtained which closely resembled naturally occurring keystone.

EXAMPLE 3

80 gallons of water was added to 20 gallons of water-extended polyester syrup. 1,500 cc. of cobalt solution and 750 cc. dimethylaniline were then added, followed by 1,500 cc. of methyl ethyl ketone peroxide solution. The entire mixture was poured into rubber molds taken from natural keystone and allowed to cure at ambient temperature for 15 to 60 minutes. Upon removal from the mold, a molded object was obtained closely resembling natural keystone in superficial properties.

It will be appreciated that while the foregoing disclosure relates only to a preferred embodiment of the invention for preparing objects of simulative keystone, it is capable of numerous modifications or alterations which may be made by those skilled in the art without departing from the spirit and scope of the invention as set forth in the appended claims.

What is claimed as new and intended to be secured by Letters Patent of the United States is:

1. A molded object closely resembling natural keystone in color, texture, appearance and consistency which comprises a cured water extendable polyester resin prepared by mixing one part by volume of water-extendable unsaturated polyester resin comprising about 40 percent of a linear unsaturated polyester resin prepared from isophthalic acid, maleic anhydride, diethylene glycol and propylene glycol and about 60 percent styrene with two to five parts by volume of water and curing said composition in a mold taken from natural keystone.

* * * * *